Figure 1:
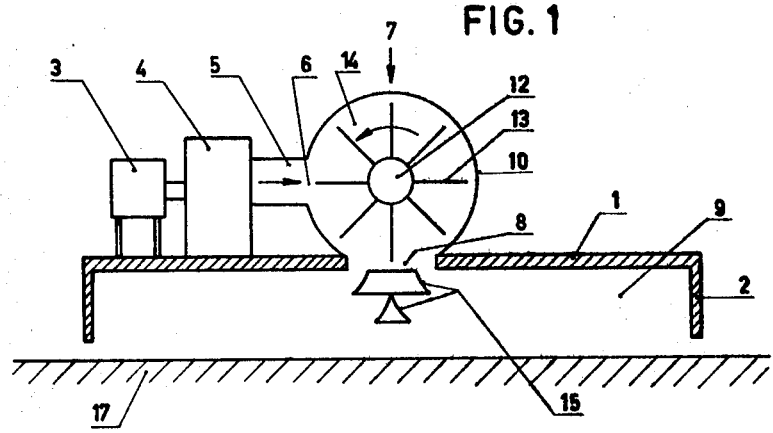

United States Patent

[11] 3,580,356

| [72] | Inventor | Pieter VanStavern<br>Pijnacker, Netherlands |
| --- | --- | --- |
| [21] | Appl. No. | 733,224 |
| [22] | Filed | May 27, 1968 |
| [45] | Patented | May 25, 1971 |
| [73] | Assignee | Nederlandse Organisatie voor Toegepast-Natuurweten-schappelijk Onderzoek ten behoeve van Nijverheid, Handle en Verkeer The Hague, Netherlands |
| [32] | Priority | May 29, 1967 |
| [33] | | Netherlands |
| [31] | | 6707422 |

[54] PRESSURE WAVE SUSTAINED VEHICLE
3 Claims, 9 Drawing Figs.

[52] U.S. Cl. ............................................. 180/116, 180/126, 114/67
[51] Int. Cl. ............................................ B60v 1/00
[50] Field of Search ............................................ 180/116, 118, 119, 127, 129, 126

[56] References Cited
UNITED STATES PATENTS

| 3,078,940 | 2/1963 | Rolle | 180/127 |
| 3,117,545 | 1/1964 | Warner | 180/116X |
| 3,331,462 | 7/1967 | Wernicke | 180/116X |
| 3,342,280 | 9/1967 | Beardsley | 180/129 |
| 3,373,836 | 3/1968 | Chaplin | 180/118 |
| 3,434,560 | 3/1969 | Rockwell, Jr. | 180/119 |

*Primary Examiner*—A. Harry Levy
*Attorney*—Hammond and Littell

ABSTRACT: A method and devices are described for sustaining a vehicle by means of pressure wave pulses generated at the bottom side of the vehicle in the medium below the bottom.

The vehicle is hovering on a continuous sequence of spaced pressure waves which are moving substantially parallel to the bottom of the vehicle and it may be propelled by any appropriate means.

PATENTED MAY 25 1971 3,580,356

SHEET 3 OF 3

PRESSURE WAVE SUSTAINED VEHICLE

The invention relates to bringing and/or keeping a vehicle hovering which is to be propelled in a fluid medium over a surface.

It is a generally known method to keep a vehicle hovering in the air by means of an air cushion which is contained as well as possible between the underside of the vehicle and a land or water surface. In this connection a constant air pressure above atmospheric is maintained under the bottom of the vehicle with the aid of a suitable installation provided on the vehicle.

It is likewise a known method to keep a vehicle hovering in water relatively to its equilibrium state with the aid of hydrofoils which, upon rapid propulsion, lift the vehicle largely above the surface of the water.

It is an object of the invention to provide for a novel and economic method for keeping a vehicle hovering over a surface.

In the case of the vehicle according to the invention the support is obtained by using pressure waves generated under the bottom of the vehicle. Such a pressure wave moves at high speed under the bottom, in other words a pressure is created which varies with its location under the bottom and the time.

If the space under the bottom is bounded by walls, then the pressure wave is reflected against these walls and again applies an upward pressure. However, since part of the pressure wave is lost through leakage under the vehicle and the rest is absorbed, fresh waves have to be constantly generated, if a constant upward pressure on the vehicle is to be obtained. The reflected pressure wave can also be regularly amplified.

By regularly generating and/or amplifying a number of pressure waves divided over the underside of the bottom of a vehicle, a uniform support is obtained owing to the high speed of the pressure waves and the mass inertia of the vehicle.

It is, therefore, a characteristic of the invention that in the space under the vehicle a number of pressure waves are generated which are divided over the surface of the vehicle bottom and run substantially parallel therewith.

The pressure waves can be generated in a generally known manner, for example by explosive combustion of a fuel-air mixture, by moving valves, by vibrating diaphragms, by pistons moving in cylinders, etc. Depending upon the configuration of the system, optimum dimensions and an optimum pressure of the wave can be determined.

The form of the vehicle, the profile of the vehicle bottom and the profile of the surface over which the vehicle hovers are not essential and the place under the bottom where the pressure waves are generated is not specific. This may take place at the outer edge, in the middle or at a place in between these.

It is known that when an airplane has a high forward speed (supersonic) there is a pressure wave which is stationary relative to the airplane which can be used as an extra support for the airplane (known as waveriders).

The support of a vehicle in accordance with the invention is fundamentally different, as use is made of pressure waves moving relatively to the vehicle, while their generation is completely independent of the vehicle's speed.

Furthermore, the medium is not limited to air; progressing pressure waves can also be generated in a liquid for use in supporting a vehicle.

The invention will be elucidated below with reference to the drawings in which one embodiment is shown as an example.

These shown in:

FIG. 1—a vertical cross section through a circular vehicle with a pressure wave support, for which the pressure waves are generated with the aid of a pulsator in the middle.

Figure 2:
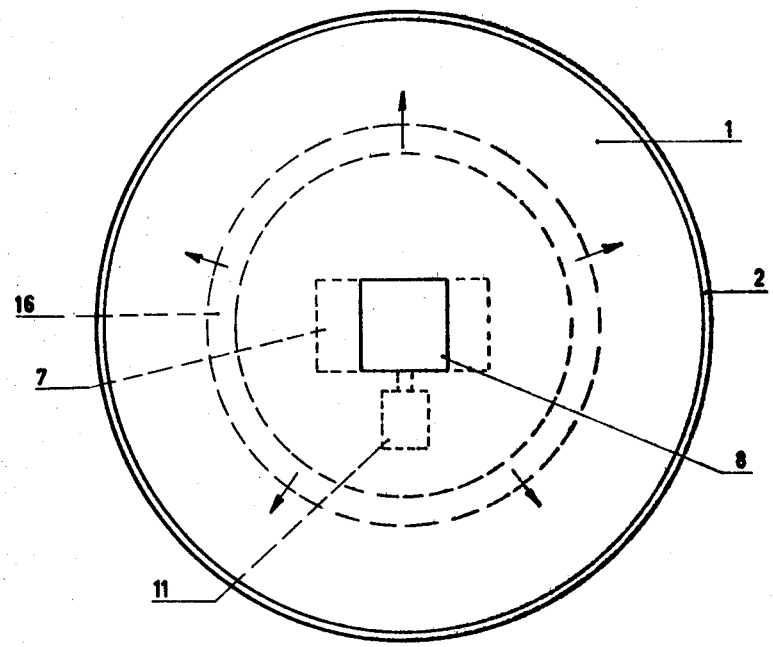

FIG. 2—a bottom view of the vehicle of FIG. 1

Figure 3:
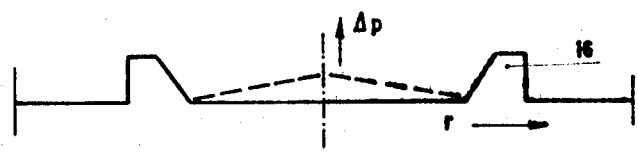
Figure 4:
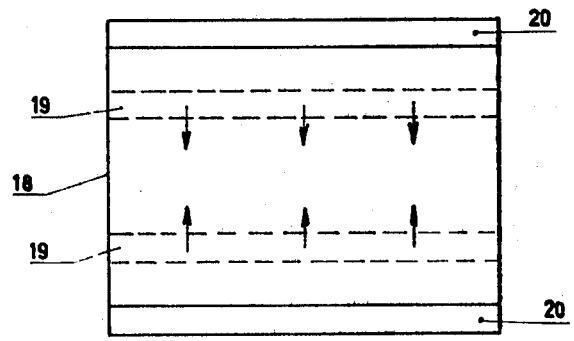
Figure 5:
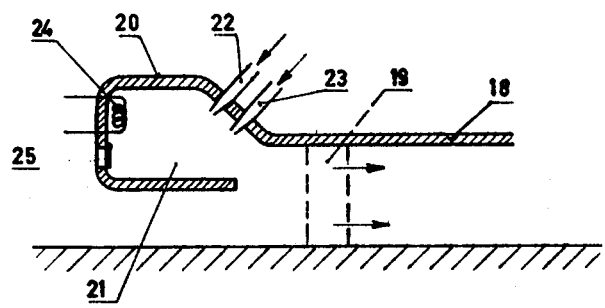

FIG. 3—a diagram of the pressure distribution over the diameter of the vehicle bottom at a given moment FIG. 4—a bottom view of a rectangular vehicle with pressure wave generation in the sidewalls FIG. 5—a vertical cross section through a sidewall of the vehicle of FIG. 4, for which the pressure waves are generated by explosive combustion of a fuel-air mixture.

Figure 6:
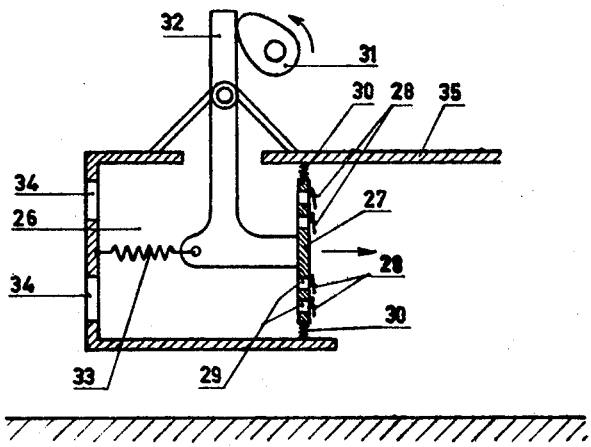
Figure 7:
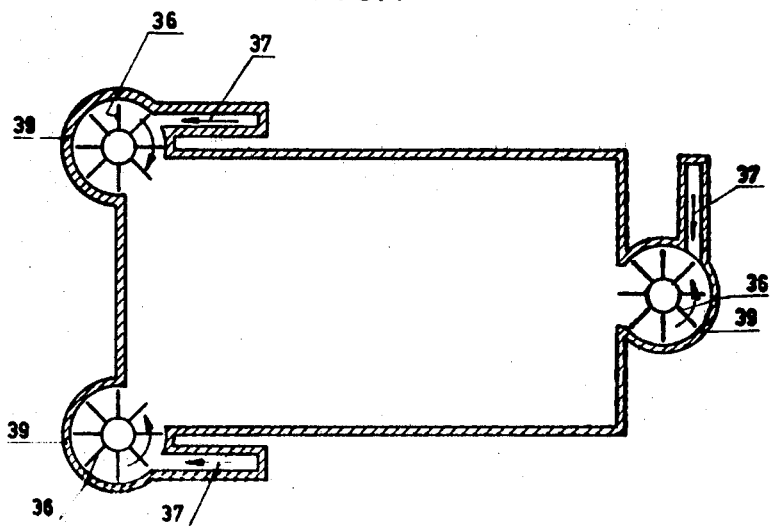
Figure 8:
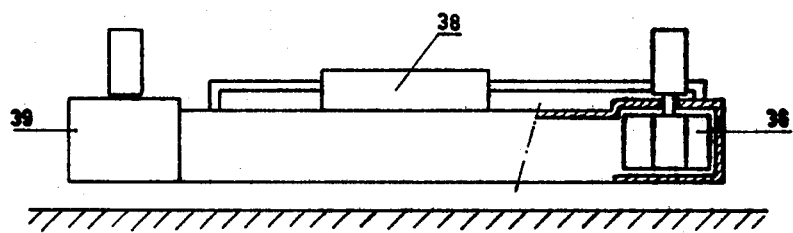

FIG. 6—a vertical cross section through a sidewall of a vehicle, for which the pressure waves are generated with the aid of moving valves FIG. 7—a bottom view of another version of a vehicle, for which the pressure waves are generated with the aid of pulsators in the sidewalls FIG. 8—a side view and partial vertical cross section of the vehicle in FIG. 7

Figure 9:
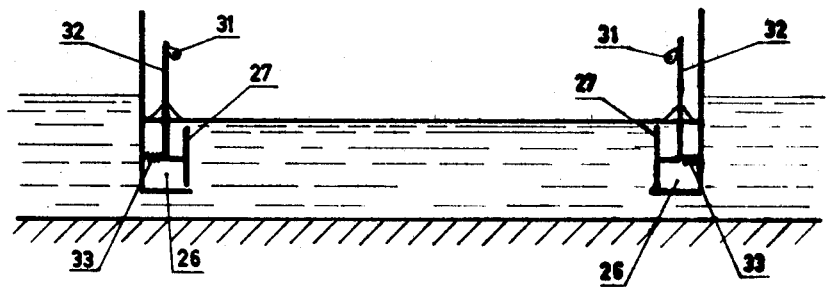

FIG. 9—an example of pressure wave support in a liquid.

FIG. 1 represents a vertical cross section of a vehicle supported by pressure waves. The bottom 1 is circular and has skirts 2 extending downwardly along the periphery which may be rigid or flexible.

An engine 3 (for instance a diesel engine, gas turbine, etc.) delivers its shaft power to a compressor 4. The compressed air is fed via a pipe 5 to an inlet 6 of a pulsator 7. This pulsator consists of a casing 10 and a rotor 12 driven by an engine 11 (see FIG. 2) and mounted in casing 10, on which rigid vanes are fitted which are at the minimum distance from pulsator casing 10.

The compressed air entering via inlet 6 fills the successively passing spaces 14 between the vanes 13. The spaces 14 thereby pressurized then successively pass pulsator outlet 8, so that the compressed air is pulsated into space 9 under the vehicle bottom via the guide blades 15.

When the peripheral speed of rotor 12 is sufficient, the emergence of the compressed air from each space 14 into outlet 8 causes a pressure wave which is propagated into space 9.

The pressure wave tries to restore the equilibrium between the air forces prevailing in space 9 after the disturbance caused by the sudden entry of a quantity of compressed air.

The pressure wave is a known phenomenon, the theory of which is extensively dealt with in several manuals, such as "The dynamics and thermodynamics of compressible fluid flow," written by A. H. Shapiro, 1954, Volume II—Part 7, The Ronald Press, N.Y.

The pressure wave generated according to the foregoing description is characterized by a field of higher pressure than that in the immediate vicinity of the pressure wave. FIG. 3 gives a diagram of the pressure distribution over the diameter of the vehicle bottom at a certain moment. In this, $\Delta p$ represents the pressure relative to that of atmospheric air and the pressure wave is indicated as 16.

FIG. 2 shows the boundaries of pressure wave 16. The pressure wave is propagated at a speed which, depending on the pressure in the wave, bears a certain relationship to the local speed of sound. This speed is always greater than such speed of sound.

With the version shown in FIGS. 1 and 2, in which the bottom 1 of the vehicle is virtually parallel to the land or water surface 17, the pressure in the pressure wave decreases during its movements from the center to the outside wall.

Two causes are responsible for this; in the first place the increase in the passage during such movement and in the second place the phenomenon that the pressure wave becomes thinner because the speed of the area of the wave in which the pressure declines is slightly greater than the speed of the front in which the pressure rises. The consequence of this latter effect is, however, that in the area enclosed by the pressure wave (i.e. in the area which the pressure wave has already passed through) a slight pressure occurs, which is represented in FIG. 3 by the broken line. This area is in fact an elongated pressure wave, in which the pressure changes with place and time. If the speed of the pulsator 7, the number of vanes 13, the content of the spaces 14, the pressure ratio of compressor 4 and the dimensions of the vehicle are chosen in the proper respective proportions, such a situation may be obtained that when the pressure wave arrives at the outside wall 2 practically nothing more remains of the pressure in the original pressure wave. After the remainder of the pressure wave has reached wall 2, air escapes from space 9 underneath the edge of outside wall 2 owing to the slight pressure left by the pressure wave in space 9, until atmospheric pressure prevails again in space 9.

If the pressure wave is not yet extinguished upon arrival at outside wall 2, the pressure wave will partly be positively reflected if there is a narrow gap between the bottom edge of outside wall 2 and the surface 17. As the gap widens nothing more will be reflected when a particular gap is reached, while as the gap widens still further there will be a negative reflection of the pressure wave. The latter event is not, of course, desirable for support of a vehicle because this effect would eliminate part of the originally occurring upward force.

With pulsator 7 described above pressure waves are generated continuously so that there are invariably one or more pressure waves simultaneously in space 9. In order to obtain pressure waves separated from one another, the distance between vanes 13 at their greatest diameter must be equal to or greater than the width of outlet 8.

It is also possible to make pulsator 7 in FIG. 1 function as a compressor, whereby compressor 4 becomes superfluous. Furthermore, the compressed air can be heated before entering the pulsator. Moreover, fuel may be fed to one of the spaces 14 at the moment just before passing the pulsator outlet 8 and each of the spaces 14 may be provided with a glow element that ignites the fuel-air mixture when a space 14 passes the pulsator outlet 8.

In the version so far described the vehicle and vehicle bottom as the case may be is circular with a flat bottom surface.

The form of the space and also the profiles of the surfaces bounding this space are not, however, essential, nor is the place where the pressure waves are generated.

In the case of centralized generation of the pressure waves, a rectangular shape may, for instance, be chosen.

FIG. 4 shows a bottom view of a rectangular vehicle 18, for which the pressure waves 19 are generated in the sidewalls 20. These pressure waves run under the vehicle bottom to the opposite wall, where part of the pressure wave can be reflected.

FIG. 5 is a vertical cross section through a sidewall 20 of the vehicle in FIG. 4. The pressure waves are generated by explosive combustion of a fuel-air mixture. Fuel is periodically supplied to the combustion chamber 21 via a nozzle 22 and the air for combustion and for removing combustion gases from the combustion chamber via a nozzle 23. A glow element 24 (for instance a glow filament) ignites the fuel-air mixture. To prevent any subpressure behind the pressure waves, a check valve 25 is fitted, through which outside air can flow into the combustion chamber 21 if the pressure there falls below atmospheric pressure. The pressure waves 19 leave the combustion chamber 21 in the direction indicated by arrows, after which they exert an upward force on the bottom of the vehicle.

The pressure waves can also be generated with the aid of moving valves.

An example of this is shown in FIG. 6, in which the space 26 is closed by a valve 27 provided with openings 29 closed by check valves 28. 30 shows a flexible seal. Valve 27 is brought into reciprocal movement by means of rotating cams 31, levers 32 and tension springs 33. The speed of cam 31 is such that the system consisting of valve 27, lever 32 and tension spring 33 is actuated at its own frequency. When valve 27 moves in the direction indicated by an arrow, a pressure wave is formed under the bottom of the vehicle 35.

During the return stroke, outside air moves via openings 34 and the openings 29 closed by check valves 28 into the space under the bottom of the vehicle 35. Optimum support is obtained if the shape and capacity of space 26 are chosen so that acoustic resonance arises therein owing to the movement of the valve.

FIG. 7 shows a version of a vehicle with pressure wave support in which the pressure waves are generated at a number of places in the vehicle's sidewalls with the aid of pulsators 36 of the type described in FIG. 1. The compressed air is supplied via ducts 37.

FIG. 8 shows a side view and partial vertical cross section through the vehicle in FIG. 7, in which 38 shows the compressor installation together with the driving motor, a pulsator 36 and the pulsator casing 39.

Lastly, FIG. 9 shows an example of a pressure wave support in a liquid in the form of a vertical cross section through a form of vehicle in accordance with the version in FIG. 6, with pressure wave generation in the sidewalls with the aid of the arrangements as in FIG. 6. The vehicle is partly in a liquid, for instance water, and has such a weight and such dimensions that it could not remain floating without pressure wave support.

I claim:

1. A vehicle for travel over and in close proximity to a surface, comprising a body having its bottom adapted to be vertically spaced above said surface and having a sufficient portion to be acted upon by continuous sequences of spaced running pressure waves so that the weight of the vehicle may be sustained, means on said body to partially circumscribe a space between said surface and said body portion, said means being defined by a downwardly extending wall portion fixed to the perimeter of said body and defining a bottom space, pulsatory means on said body for supplying a continuous sequence of spaced running pressure waves into said bottom space, said means comprising pulsatory means for supplying said spaced running pressure waves to said bottom space and transmitting them substantially parallel to the bottom of said body portion to sustain said vehicle above said surface.

2. The vehicle of claim 1 in which the body is substantially circular, and wherein said downwardly extending wall portion defining said bottom space is a downwardly facing annular wall portion, said pulsatory means being disposed in the center of said body.

3. The vehicle of claim 1 in which the body is substantially rectangular and has means to partially circumscribe a space between said surface and said body portion, said means being said downwardly extending wall portion and being defined by at least two downwardly facing parallel wall portions fixed to two opposing edges of said rectangular body, said pulsatory means being installed at the inner sides of said parallel walls and being defined by a number of devices for generating said continuous sequences of spaced running pressure waves via outlet means dividing the pressure waves over the surface of said bottom portion and transmitting them substantially parallel to the surface of said bottom portion to sustain said vehicle above said surface.